US008656041B2

(12) United States Patent
Kim et al.

(10) Patent No.: US 8,656,041 B2
(45) Date of Patent: Feb. 18, 2014

(54) SYSTEM AND METHOD FOR DISTRIBUTING MULTIMEDIA STREAMING SERVICE REQUEST BASED ON WIDE AREA NETWORK

(75) Inventors: Chang Soo Kim, Daejeon (KR); Won Jae Lee, Daejeon (KR); Yoo Hyun Park, Daejeon (KR); Hag Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 920 days.

(21) Appl. No.: 12/264,515

(22) Filed: Nov. 4, 2008

(65) Prior Publication Data

US 2009/0157894 A1 Jun. 18, 2009

(30) Foreign Application Priority Data

Dec. 17, 2007 (KR) ........................ 10-2007-0132584

(51) Int. Cl.
*G06F 15/16* (2006.01)
(52) U.S. Cl.
USPC .......................................................... 709/231
(58) Field of Classification Search
USPC .......................................................... 709/231
See application file for complete search history.

(56) References Cited

U.S. PATENT DOCUMENTS

| 7,299,291 B1* | 11/2007 | Shaw ............................ 709/231 |
| 2006/0112176 A1* | 5/2006 | Liu et al. ....................... 709/223 |
| 2009/0320077 A1* | 12/2009 | Gazdzinski ..................... 725/62 |

FOREIGN PATENT DOCUMENTS

| KR | 10-0149211 | 6/1998 |
| KR | 10-2005-0060797 | 6/2005 |
| KR | 10-2006-0071767 | 6/2006 |
| KR | 1020060070287 | 6/2006 |
| KR | 10-2007-0060991 | 6/2007 |

OTHER PUBLICATIONS

Office Action dated Jan. 30, 2009, for Korean application No. 10-2007-0132584.
Notice of Allowance dated Jul. 21, 2009, for Korean application No. 10-2007-0132584.
"Geographic Load Balancing for Scalable Distributed Web Systems" by Valeria Cardellini et al. on In Proceedings of Mascots, as of 2000.

* cited by examiner

*Primary Examiner* — Maceeh Anwari
(74) *Attorney, Agent, or Firm* — Lowe Hauptman & Ham LLP

(57) ABSTRACT

Provided are a system and a method for distributing multimedia streaming service request based on wide area network which can efficiently support multimedia streaming service in wide area network. The system for distributing multimedia streaming service request based on wide area network includes a user terminal, a wide area server, and a local server. The user terminal requests multimedia streaming service. The wide area server for selecting a local server which is disposed nearest to the user terminal and has node availability and service availability, and providing contents requested by the user terminal to the selected local server. The local server provides the multimedia streaming service to the user terminal using the contents provided from the wide area server.

9 Claims, 4 Drawing Sheets

SYSTEM AND METHOD FOR DISTRIBUTING MULTIMEDIA STREAMING SERVICE REQUEST BASED ON WIDE AREA NETWORK

CROSS-REFERENCE TO RELATED APPLICATIONS

This application claims priority under 35 U.S.C. §119 to Korean Patent Application No. 10-2007-0132584, filed on Dec. 17, 2007, the disclosure of which is incorporated herein by reference in its entirety.

BACKGROUND OF THE INVENTION

1. Field of the Invention

The present disclosure relates to wide area network (WAN), and more particularly, to a system and a method for distributing multimedia streaming service request, based on wide area network, which can efficiently support a multimedia streaming service in wide area network.

This work was supported by the IT R&D program of MIC/ITA. [2007-S-016-01, A Development of Cost Effective and Large Scale Global Internet Service Solution]

2. Description of the Related Art

The current network infrastructure has evolved by leaps and bounds, but popularization of World Wide Web, introduction of e-commerce, and activation of online game have exponentially increased demand on network infrastructure, and a network has reached limits in capacity.

FIG. 1 is a block diagram illustrating a basic structure of a conventional multimedia streaming service providing system. Referring to FIG. 1, a system for providing a multimedia streaming service is basically configured with a streaming server for transmitting multimedia contents to a user, a user terminal for showing the transmitted contents to a user, and a network connecting the streaming server to the user terminal.

In such a system, if a bottleneck occurs in the network connecting the user terminal to the streaming server, it is impossible to provide a multimedia streaming service to the user while guaranteeing a desired quality. Accordingly, a contents delivery network (CDN) strategically disposes a plurality of server systems providing the streaming service in various areas, and thus it is used for providing services at positions nearer to users, while guaranteeing quality desired by users.

In the CDN, a wide area server functions as a contents source providing contents to the local servers or local server clusters of each area. Moreover, when a user request a service for specific multimedia streaming contents, the wide area sever receives the service request and redistributes the service request to a local server disposed nearest to the user in terms of geography or a network structure. The local server or the local server cluster provides actual multimedia contents to users. The existing CDN redistributes a service request in a scheme using a domain name server (DNS). This scheme selects a server which is nearest (in terms of geography or the network structure) to a local DNS server managing the DNS queries of users.

However, such a scheme is based on not proximity between a server and an actual client, but proximity between a DNS server having the authority of a server and a client local DNS server. In this case, if a user domain managed by a specific local DNS server is broad, many inaccuracies arise when predicting proximity between a user and an actual server. This scheme has a disadvantage in that two or more local servers or local server clusters are not allowed in a client domain sharing one local DNS server. Moreover, there exist a plurality of intermediate DNS servers between the local DNS servers of clients and DNS servers having the authority of a server, each of the DNS servers caches an address mapping result during time to live (TTL). The TTL value may be adjusted. However, since the very small TTL value increases the load of the DNS servers and the address mapping requests over a network, network providers do not favor a very small TTL value. Therefore, in most cases, the network providers ignore a certain limits value or less TTL values. In view of these, a request distributing scheme based on the DNS does never have a control right, and thus it causes an unsuitable request distribution result when changing a network state.

A wide area request distributing scheme for the CDN selects a local server capable of providing services to a user at the highest quality and the lowest cost possible upon the user's request, and thereafter must distribute the request to the corresponding local server. Generally, a local server that is nearest to a user in terms of geography or network is selected as a local server to provide the service. The network proximity measurement scheme uses a static scheme predicting proximity in view of network topology such as network hop counts, or a dynamic scheme measuring round trip time (RTT) or available bandwidth. In a case of the static scheme, since a proximity information is fixed, the static scheme has a high performance for the selection of local servers whereas does not reflect the real-time environment of the network. On the other hand, the dynamic scheme may reflect the real-time environment of the network to perform an exact selection, but delays the execution of services because of taking much time in predicting proximity. Moreover, when a corresponding local server is down, existing local server selection schemes prevent a service request from being distributed to the corresponding local server. However, since the existing local server selection schemes check only whether the local server is alive, they do not prevent a service request from being distributed to a corresponding local server which cannot actually execute services by exceeding its service capacity.

SUMMARY

Therefore, an object of the present invention is to provide a system and a method for distributing multimedia streaming service request based on wide area network which can efficiently support high-quality multimedia streaming service in wide area network or contents delivery network integrating various areas.

To achieve these and other advantages and in accordance with the purpose of the present invention as embodied and broadly described herein, a system for distributing multimedia streaming service request based on wide area network in accordance with an aspect of the present invention includes: a user terminal for requesting multimedia streaming service; a wide area server for selecting a local server which is disposed nearest to the user terminal and has node availability and service availability, and providing contents requested by the user terminal to the selected local server; and a local server for providing the multimedia streaming service to the user terminal using the contents provided from the wide area server.

To achieve these and other advantages and in accordance with the purpose of the present invention, a method for distributing multimedia streaming service request based on wide area network in accordance with another aspect of the present invention includes: receiving a request of the multimedia streaming service from a user terminal; selecting a local server which is nearest to the user terminal and has a node availability and a service availability; and delivering the service request to the selected local server.

To achieve these and other advantages and in accordance with the purpose of the present invention, a method for distributing multimedia streaming service request based on wide area network in accordance with another aspect of the present invention includes: receiving a request of the multimedia streaming service in a real-time streaming protocol (RTSP) describe method from a user terminal; generating a static proximity table based on network topology by the wide area request distributor; selecting a local server on the basis of the generated static proximity table and entering an IP address of a requesting client in a pending table by the wide area request distributor; transmitting an address information of the selected local server to the user terminal in RTSP redirect method, wherein the user terminal requests an RTSP describe to the address of the selected local server and receives a corresponding service.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
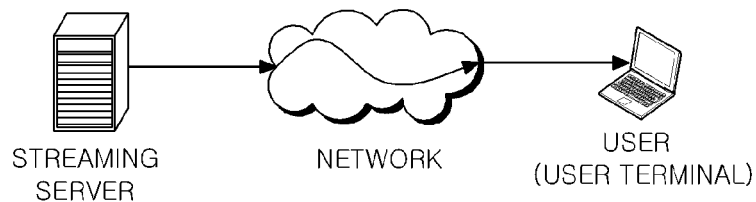
FIG. 1 is a block diagram illustrating a basic structure of a conventional multimedia streaming service providing system.

Hereinafter, specific embodiments will be described in detail with reference to the accompanying drawings. In the accompanying drawings, it should be seen that the same elements are illustrated as the same reference numerals at any portion as far as possible. Moreover, the detailed description of the known function and configuration which may unnecessarily obscure the essential points of the present invention will be omitted.

Figure 2:
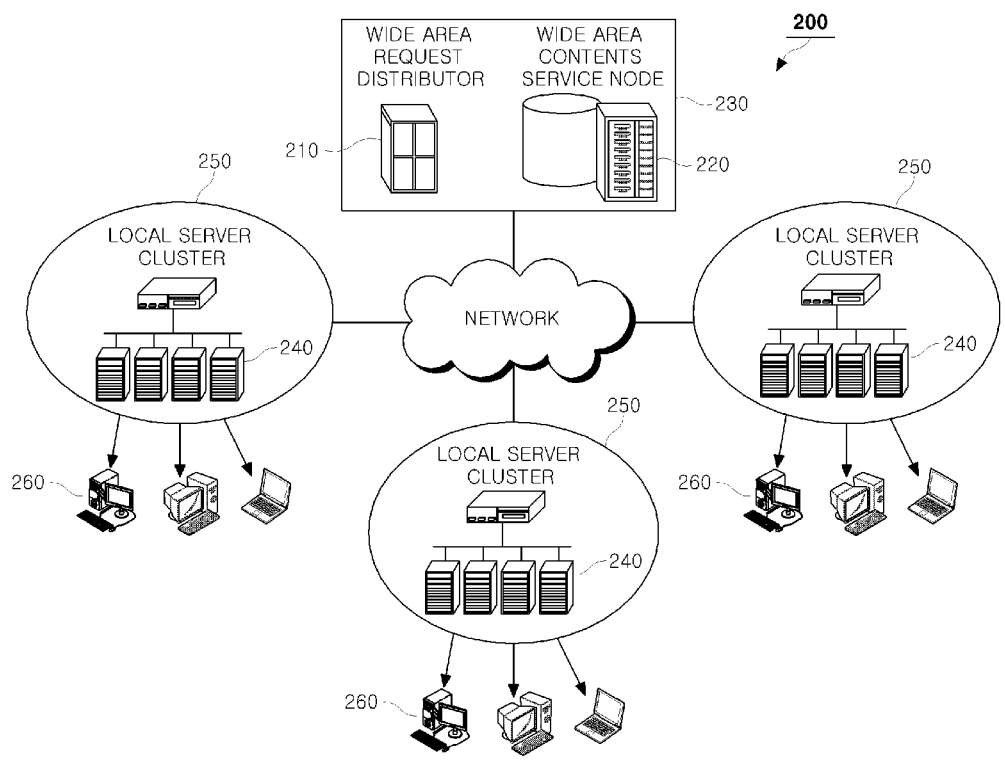
FIG. 2 is a block diagram of a system for distributing multimedia streaming service request based on wide area network according to the present invention.

FIG. 2 is a block diagram of a system for distributing multimedia streaming service request based on wide area network according to the present invention.

Referring to FIG. 2, a system for distributing multimedia streaming service request based on wide area network 200 includes a wide area request distributor 210, a wide area contents service node 220, a plurality of local servers 240 (or a local server cluster 250), and a plurality of user terminals 260.

The wide area request distributor 210 and the wide area contents service node 220 perform the function of a wide area server 230. The wide area contents service node 220 stores all multimedia contents to be provided to a final user. The wide area request distributor 210 delivers the service request of a user to the local servers 240 or the local server cluster 250 based on a wide area network. Each of the local servers 240 (or a local server cluster 250) receives contents from the wide area contents service node 220 and provides a multimedia streaming service to the user terminals 260. The user terminals 260 play multimedia contents transmitted from the local servers 240 or the local server cluster 250.

In the present invention, a wide area request may be processed by the wide area request distributor 210, which selects the local server 240 (or a local server cluster 250) to process a corresponding service request when receiving the corresponding service request from a user. When the local server 240 (or a local server cluster 250) is selected, the wide area request distributor 210 delivers the corresponding service request to the selected local server 240 (or the selected local server cluster 250). Two tasks performed by the wide area request distributor 210 will be described in detail below.

The first process is one that selects the local server 240 (or the local server cluster 250). This process may include a first operation generating a static proximity table based on the network topology; a second operation selecting the local server 240 (or the local server cluster 250) on the basis of the generated proximity table, and entering the Internet Protocol (IP) address of a request client in a pending table; and a third operation periodically requesting the local server 240 (or the local server cluster 250) to measure proximity for each row of the pending table, rectifying the proximity table based on the responses to the requests, and deleting a corresponding row in the pending table.

Since the wide area request distributor 210 selects the local server 240 (or the local server cluster 250) using the proximity table via the second operation of the operations, the present invention can provide far higher performance. Since the proximity of a client requesting a service in the third operation is again measured, the present invention can reflect the real-time environment of the network. The re-measurement of the proximity may be performed in a background process (e.g., pending_resolv process). To measure the proximity in delayed fashion in the third operation, the wide area request distributor 210 stores the IP address of a service-requesting client in the pending table in the second operation.

The structure of the proximity table is the same as the following Table 1.

TABLE 1

| Field Name | Data Type | Description |
| --- | --- | --- |
| LOW | INTEGER | Lower Value of Address Range |
| HIGH | INTEGER | Upper Value of Address Range |
| FIRST | CHAR | Address of First-Ranked Proximity |
| SECOND | CHAR | Address of Second-Ranked Proximity |
| THIRD | CHAR | Address of Third-Ranked Proximity |

Referring to the Table 1, the configuration of the proximity table maintains the address of a local server cluster having the first-ranked proximity of proximities to an address range, the address of a local server cluster having the second-ranked proximity of the proximities to the address range, and the address of a local server cluster having the third-ranked proximity of the proximities to the address range. For example, assuming that the IP address of the local server cluster having the first-ranked proximity is 125.200.10.5, the IP address of the local server cluster having the second-ranked proximity is 140.100.2.5, and the IP address of the local server cluster having the third-ranked proximity is 210.5.10.7, in terms of clients within an address range from IP address 100.200.300.0 to IP address 100.200.300.255, a corresponding column is the binary value of the IP address 100.200.300.0, the binary value of the IP address 100.200.300.255, 125.200.10.5, 140.100.2.5 and 210.5.10.7.

The Table 2 shows the structure of the pending table.

TABLE 2

| Field Name | Data Type | Description |
|---|---|---|
| IP address | CHAR | Client IP address |

As shown in Table 2, the pending table records the IP address of the service-requesting client, and keeps tracks to measure the proximity by the background process of the wide area request distributor 210 (e.g., the pending_resolve process) in the next.

The generation of the proximity table in the first operation may be built based on entire IP address allocation information provided by agencies supplying the information providing services of service target areas (e.g., the whois service).

In the second operation, the wide area request distributor 210 receives the client's request and selects the local server 240 (or the local server cluster 250) based on the IP address of the client and the proximity table. Moreover, the wide area request distributor 210 inserts the IP address of the client in the pending table. Three local servers (or local server clusters) appear in the proximity table, the address of the first local server (or the first local server cluster) is commonly selected. However, when the first local server (or the first local server cluster) cannot be used due to an error etc, the second local server (or the second local server cluster) may be selected for the availability of a service. Because of such a reason, three local server cluster fields of the proximity table may be stored on specific IP address range. However, this merely is an embodiment. That is, it would be easily understood by those skilled in the art that the number of the local server (or the local server cluster) field of the proximity table may be fully extended or reduced according to an application.

The wide area request distributor 210 may maintain a CONFIG table in order to store and maintain the availability environment of each local server 240 (or local server cluster 250). The following Table 3 shows the structure of the CONFIG table.

TABLE 3

| Field Name | Data Type | Description |
|---|---|---|
| IP address | CHAR | IP address Address |
| NAME | CHAR | Domain Name |
| AVAIL | CHAR | Availability ('Y', 'N') |

The CONFIG table maintains information of all local servers 240 (or local server clusters 250) being a target to which the wide area request distributor 210 distributes a request. The configuration field of the CONFIG table has the following meanings. The IP address and NAME fields are the address and domain name of the local server 240 (or the local server cluster 250) (in the case of the local server cluster, the IP address and NAME fields are the representative address and domain name of the cluster). The AVAIL field is a field representing the availability of the local server 240 (or the local server cluster 250), and has a value of the 'Y' when it is available at present. When the service is impossible at present, the AVAIL field has a value of the 'N'. The availability information of a corresponding local server 240 (or the server cluster 250) has the value of the 'N' when the local server 240 does not operate actually (in the case of the local server cluster 250, when all nodes 240 in the local server cluster 250 do not operate). However, even when the load of the local server 240 (or the loads of all nodes 240 in the local server cluster 250) has a limit value or more, the availability information of the corresponding local server 240 (or the local server cluster 250) may have the value of the 'N'. This prevents a request from being distributed to an overloaded local server 240 (or local server cluster 250) in advance, thereby improving the reliability of the service increasingly.

In the third operation, the background process of the wide area request distributor 210 (for example, the pending_resolv process) requests all local servers 240 (or local server clusters 250) registered in the CONFIG table to measure the proximity of each client's IP address recorded in the pending table. Each local server 240 (or the local server cluster 250) measures the RTT value a certain number of times (e.g., n times). The number of times the RTT is measured may vary with settings.

The second task of two tasks performed by the wide area request distributor 210 delivers a service request to the selected local server 240 (or the selected local server cluster 250), and a service request delivering scheme may be used in a fourth layer or a seventh layer of network layers. However, since the local server 240 (or the local server cluster 250) according to the present invention is the same server group providing services of the same contents group, there is no need to use the seventh layer delivering a request by checking uniform resource locator (URL). Therefore, in terms of efficiency, it is more preferable to process in the fourth layer without processing in the seventh layer.

Figure 3:
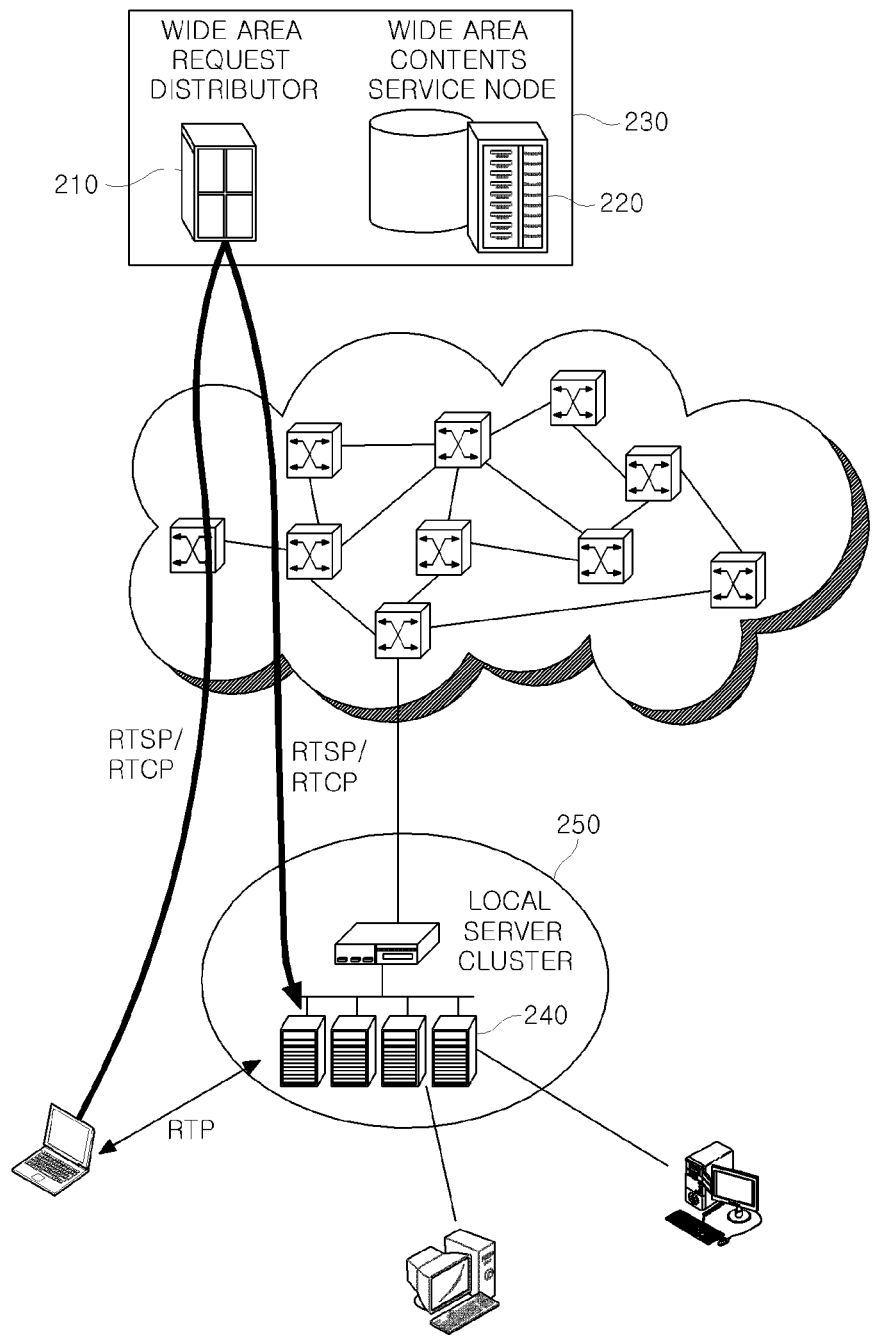
FIG. 3 is a service configuration illustrating request delivery paths according to a typical 3-way scheme.

Generally, the fourth layer widely uses a request delivery scheme according to a 3-way scheme of FIG. 3 in order to show a good performance. FIG. 3 is a service configuration illustrating request delivery paths according to a typical 3-way scheme. However, in a case of using the 3-way scheme, the selected local server 240 (or the selected local server cluster 250) provides services by directly sending a response to a client (in the case of the local server cluster, the distribution of a request is performed once more by the local server cluster so that a service is provided by specific server node in the local server cluster), but provides a service by still entering the address of the wide area request distributor 210 as a source address of a response packet. This means that all requests from clients must be delivered to the local server cluster 240 through the wide area request distributor 210 while a session is being connected.

Meanwhile, examples of a protocol for providing a multimedia streaming service based on the Internet at present include the Real-Time Protocol (RTP), the Real-Time Control Protocol (RTCP), the Real-Time Streaming Protocol (RTSP), etc. The RTP is used for transmitting actual streaming data having real-time characteristics and is based on User Datagram Protocol (UDP). The RTCP is used together with the RTP, and is a control protocol used for performing the feedback of information associated with transmission quality such as a packet loss rate, jitter and the Round Trip Time (RTT). The RTSP is a protocol used for establishing and controlling connection between servers and clients.

A problem may occur in a case of using the 3-way scheme as a wide area request delivery scheme in interworking with the RTP, the RTCP and the RTSP. Since the transmission of the streaming data by the RTP is directly performed in the actual local server 240 (or local server cluster 250), a problem does not occur. On the other hand, a client should often provide information such as the packet loss rate and whether the jitter occurs to a server via the use of the RTCP while playing the streaming contents, and should transmit control commands such as fast forward, fast rewind, stop and restart via the use of the RTSP. At this point, if a request is delivered by the 3-way scheme, both the information and the control commands are transmitted to the wide area request distributor 210.

Referring to FIG. 3, since a network path from a client to the wide area request distributor 210 and a network path from the wide area request distributor 210 to the local server 240 (or the local server cluster 250) is relatively a far longer distance than a network path from the client to the local server 240 (or the local server cluster 250), it is difficult to transmit this information to the servers 230, 240 and/or 250 at a suitable timing. Moreover, the processing and delivery of the information causes high loads to the wide area request distributor 210 processing a great number of users' requests.

Accordingly, in the present invention, when the wide area request distributor 210 selects the local server 240 (or the local server cluster 250) for delivering the service requests of users, it delivers the users' requests to the selected local server 240 (or the selected local server cluster 250) by using the RTSP redirect method. A detailed delivery scheme will be described with reference to FIG. 4.

Figure 4:
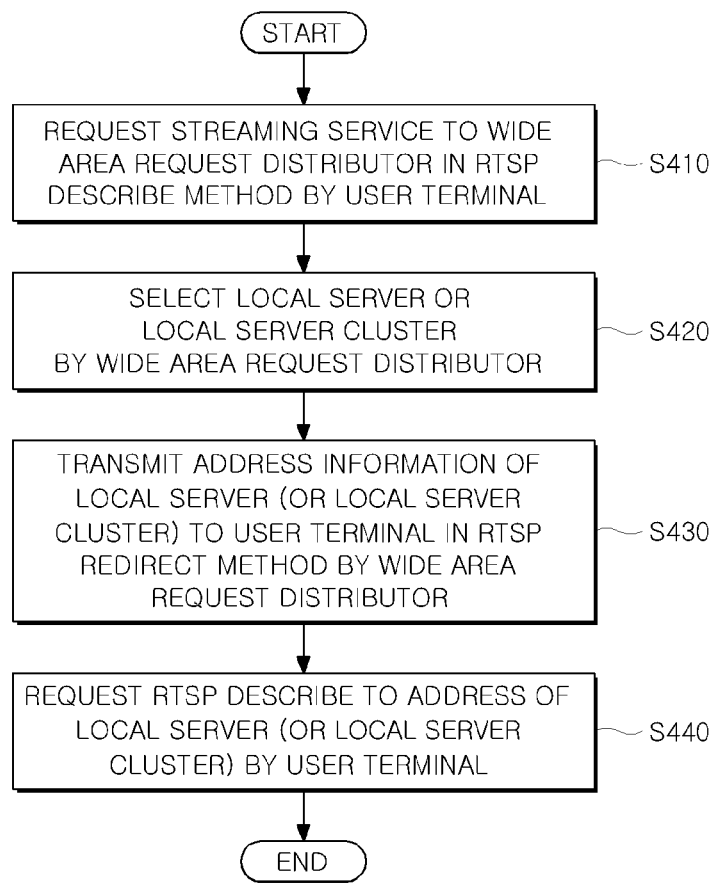
FIG. 4 is a flowchart illustrating a method for distributing multimedia streaming service request based on wide area network according to an embodiment of the present invention.

FIG. 4 is a flowchart illustrating a method for distributing multimedia streaming service request based on wide area network according to an embodiment of the present invention. Referring to FIG. 4, the user terminal 260 requests the streaming service to the wide area request distributor 210 using the RTSP describe method, in operation S410.

The wide area request distributor 210 selects the local server 240 (or the local server cluster 250) according to the operation of selecting the local server 240 (or the local server cluster 250) as described above, in operation S420.

When the selection of the local server 240 (or the local server cluster 250) is completed, the wide area request distributor 210 transmits the address information of the selected local server 240 (or the selected local server cluster 250) to the user terminal 260 using the RTSP redirect method, in operation S430.

The user terminal 260 receiving the address information can request "RTSP describe" to the address of a corresponding local server 240 (or a corresponding local server cluster 250) and can be provided a corresponding service, in operation S440.

While providing the streaming service, since the RTSP and the RTCP know a redirected address, higher performance can be expected by directly communicating through a corresponding address. Consequently, any additional overhead is not provided to the wide area request distributor 210.

According to the method for distributing multimedia streaming service request based on wide area network of the above-described present invention, the wide area request distributor 210 receives requests from all users intending to receive the streaming service. Accordingly, because the wide area request distributor 210 is restricted in extension due to the bottleneck, it may not provide reliable services.

Figure 5:
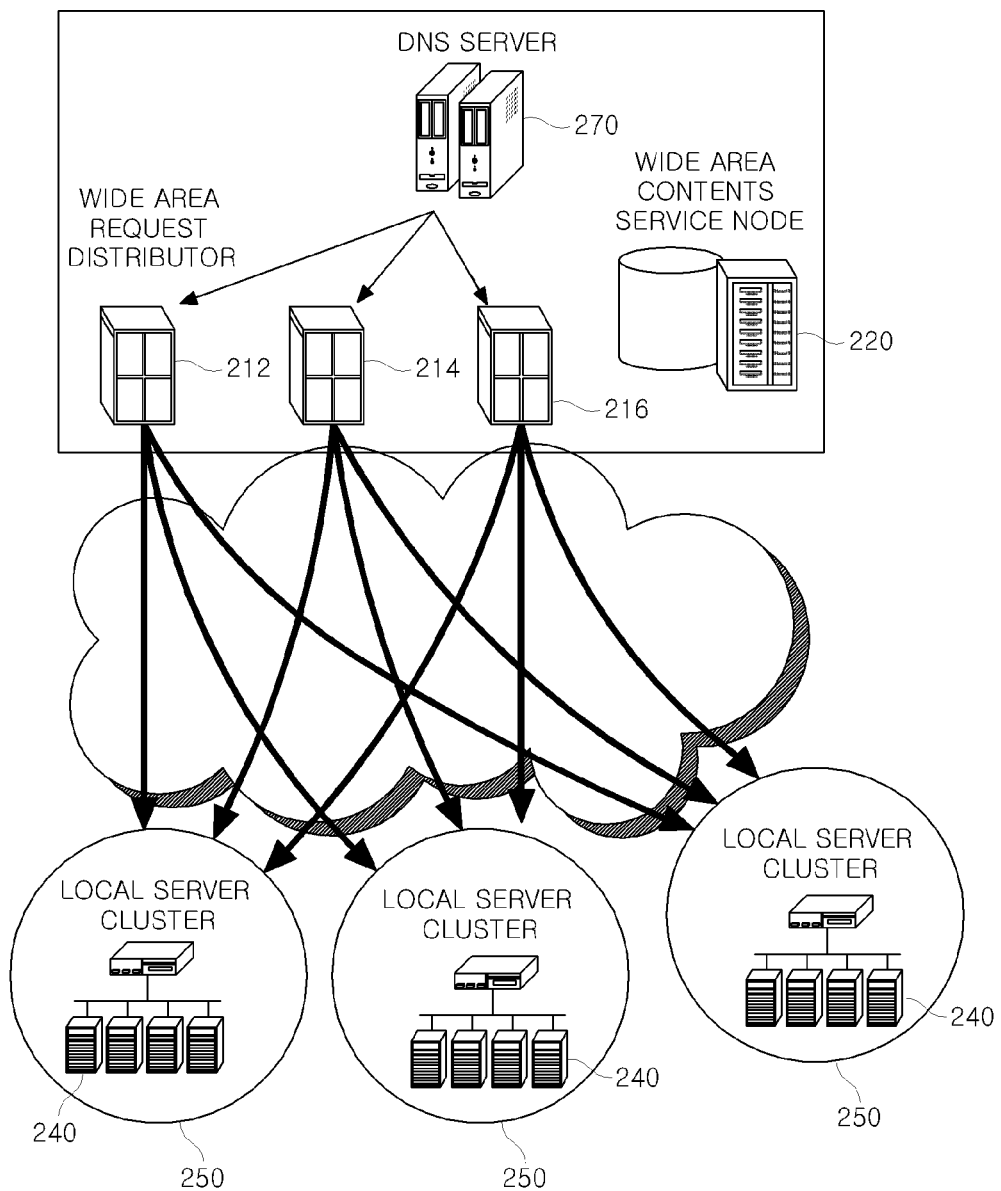
FIG. 5 illustrates the configuration and request distributing paths of a system for distributing multimedia streaming service request based on wide area network according to another embodiment of the present invention.

As illustrated in FIG. 5, since the present invention groups a plurality of wide area request distributors 212, 214 and 216 over a domain name system (DNS) server 270, it proposes a scheme for improving extension and reliability of services. FIG. 5 illustrates the configuration and request distributing paths of a system for distributing multimedia streaming service request based on wide area network in accordance with another embodiment of the present invention. Herein, the DNS server 270 may select and use a suitable one of the wide area request distributors 212, 214 and 216 on the basis of the availability and performance of the wide area request distributors 212, 214 and 216.

A system and a method for distributing multimedia streaming service request based on wide area network according to the present invention, which can increase the reliability of services by selecting local servers based on exacter information while maintaining such higher performance as that of the conventional static scheme, in distributing the multimedia streaming service requests of users to local servers or local server clusters disposed at main areas in wide area network.

The present invention can provide far higher performance by using a proximity table, and reflect the real-time environment of a network and at the same time minimize the delay of services by periodically performing the prediction of proximity on a corresponding client, in predicting proximity.

The present invention can enhance the reliability and availability of services by considering the availability of the services as well as the node availability of a local server to deliver the request of a client.

The present invention can support high-performance seamless services by transmitting information and controlling data through the direct communication between a client and a local server providing actual services, thereby enhance the service satisfaction of users.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A system for distributing a multimedia streaming service request based on a wide area network, the system comprising:
   a user terminal for requesting multimedia streaming service;
   a wide area server for selecting a local server which is disposed nearest to the user terminal, wherein the local server has node availability and service availability, and wherein the wide area server provides contents requested by the user terminal to the selected local server; and
   a local server for providing the multimedia streaming service to the user terminal using the contents provided from the wide area server;
   wherein the wide area server comprises:
      a wide area contents service node for storing a plurality of contents for providing to the user terminal; and
      at least one wide area request distributor for storing tables having information that includes node availability, service availability, and proximity of the local servers, the wide area request distributor is configured to select the local server nearest to the user terminal based on the stored tables, and for providing contents requested by the user terminal to the selected local server from the wide area contents service node, the at least one area request distributor further comprising a pending table for inserting an IP address of the user terminal requesting a service.

2. The system of claim 1, wherein the tables include:
a static proximity table for representing the proximity according to IP address based on network topology; and
a CONFIG table for representing the node availability and service availability of each of the local servers.

3. The system of claim 2, wherein the wide area request distributor is configured to periodically request the local servers to measure the proximity on the IP address of each of the user terminals in the pending table, and is configured to update contents of the static proximity table according to responses of the request.

4. The system of claim 1, wherein the user terminal requests of the wide area request distributor the multimedia streaming service through a real-time streaming protocol (RTSP) DESCRIBE request.

5. The system of claim 1, further comprising a domain name system (DNS) server for selecting one wide area request distributor to process the request of the user terminal on the basis of the availability and performance of the wide area request distributors.

6. A method for distributing a multimedia streaming service request based on a wide area network, the method comprising the following steps performed at a wide area server:
receiving a request of the multimedia streaming service from a user terminal, wherein the request includes a real-time streaming protocol (RTSP) DESCRIBE request;
selecting a local server that is nearest to the user terminal and that has a node availability and a service availability;
delivering the service request to the selected local server, wherein delivering includes transmitting address information of the selected local server to the user terminal according to an RTSP REDIRECT command;
receiving at the user terminal the address information;
communicating an RTSP DESCRIBE request to the selected local server; and
receiving at the user terminal a corresponding service;
wherein the selecting of the local server comprises:
generating a static proximity table based on network topology; and
selecting a local server on the basis of the generated proximity table; and
entering an IP address of a requesting client in a pending table.

7. The method of claim 6 further comprising selecting, by a domain name system (DNS) server, a wide area request distributor to process the request of the client on the basis of an availability and a performance.

8. The method of claim 6, further comprising: periodically requesting local servers a measurement of a proximity for each row of the pending table, rectifying the static proximity table and deleting a corresponding row in the pending table according to responses of the request.

9. The method of claim 6, wherein generating a static proximity table comprises: recording an upper value of an address range; recording a lower value of an address range; and ranking a plurality of local servers configured to communicate requested service to the user terminal according to proximity of each server of the plurality to the address range.

* * * * *